United States Patent
Takahashi

(10) Patent No.: US 8,050,155 B2
(45) Date of Patent: Nov. 1, 2011

(54) DISC PLAYBACK APPARATUS

(75) Inventor: Akihito Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 12/529,578

(22) PCT Filed: Nov. 22, 2007

(86) PCT No.: PCT/JP2007/072674
§ 371 (c)(1),
(2), (4) Date: Sep. 2, 2009

(87) PCT Pub. No.: WO2008/111266
PCT Pub. Date: Sep. 18, 2008

(65) Prior Publication Data
US 2010/0085850 A1 Apr. 8, 2010

(30) Foreign Application Priority Data
Mar. 15, 2007 (JP) .................................. 2007 067093

(51) Int. Cl.
*G11B 20/00* (2006.01)
(52) U.S. Cl. .................................. 369/47.15; 369/30.03
(58) Field of Classification Search ............... 369/47.15, 369/47.16, 47.17, 30.03, 30.04, 83; 375/365, 375/340
See application file for complete search history.

(56) References Cited

U.S. PATENT DOCUMENTS

2005/0201495 A1 9/2005 Sogabe et al.
2008/0177775 A1* 7/2008 Kawate et al. ................ 707/102

FOREIGN PATENT DOCUMENTS

| JP | 11-317020 A | 11/1999 |
|---|---|---|
| JP | 2002-170330 A | 6/2002 |
| JP | 2004-178646 A | 6/2004 |
| JP | 2005-259220 A | 9/2005 |

* cited by examiner

*Primary Examiner* — Ali Neyzari
(74) *Attorney, Agent, or Firm* — Birch, Stewart, Kolasch & Birch, LLP

(57) ABSTRACT

A disc playback apparatus includes a decoder 15 for decoding audio files respectively corresponding to different data formats, which are stored in a storage unit, on the basis of a file attribute preset thereto, and for playing back the decoded audio files, and a control unit 16 for determining a file attribute of data read from the storage unit when starting the decoding and playback process on a basis of the file attribute set to the decoder, and for, when the file attribute differs from the file attribute set to the decoder, holding address information about the read data, and, after stopping the reading of subsequent data, changing the setting of the file attribute made for the decoder and then restarting to read the data by using the address information held thereby.

4 Claims, 4 Drawing Sheets

DISC PLAYBACK APPARATUS

FIELD OF THE INVENTION

The present invention relates to a disc playback apparatus suitable for use in playback of a disc in which at least two audio files having different data formats are recorded.

BACKGROUND OF THE INVENTION

Each of CD-DA (Compact Disc Digital Audio) and dts-CD (Digital Theater System Compact Disc) is specifications which define a music file recorded in a CD recording medium. CD-DA has a feature that sound quality does not degrade by virtue of digital sound recording of a piece of music using a PCM (Pulse Code Modulation) method having a sampling frequency of 44.1 kHz and 16-bit quantization. In contrast, a dts-CD is a medium recorded according to the dts-CD format specifications, and cannot be played back via an analog output of a general CD player, but can be used to reproduce a high-quality signal of 5.1 channels via a digital output using a decoder for DTS.

Recently, users have become able to acquire music files transmitted through network electric delivery by downloading them, and have mixedly recorded these music files which may have different data formats into a single disc frequently to listen to them.

By the way, data which comply with each of above-mentioned CD-DA and dts-CD specifications are recorded into a CD recording medium, and it is difficult for any playback equipment to identify whether a CD recording medium is a CD-DA medium or a dts-CD medium without analyzing actual data recorded in the CD recording medium. A conventional playback apparatus inputs data recorded in a disc to a decoder and discriminates whether the disc is of CD-DA type or dts-CD type from a response of the decoder.

However, because this method requires much time before the media type is determined and an audio is then outputted, there is a case in which the user doubts that the CD medium is a defective or the playback apparatus is out of order. A further problem with the conventional playback apparatus is that even if the conventional playback apparatus judges that the disc is of dts-CD type when discriminating whether the disc is of CD-DA type or dts-CD type from the response of the decoder, the conventional playback apparatus cannot output the audio correctly when data yet to be played back, except the data inputted to the decoder, are based on the CD-DA specifications. Furthermore, the same problem arises in playback of data having the same extension.

Conventionally, a playback apparatus that detects a stream synchronizing signal immediately before inputting data read from a CD to a decoder in order to judge whether a digital acoustic signal recorded in the CD is a PCM digital acoustic signal or a stream signal compression-coded at a variable-length bit rate, such as a signal based on MP3 (MPEG Audio Layer level 3), is known (for example, refer to patent reference 1). The conventional playback equipment judges the type of the data by detecting the stream synchronizing signal, and counts the amount of data so as to determine the next-time address. When the counter reaches a predetermined value, the conventional playback apparatus judges that the digital acoustic signal is a stream signal, whereas when the counter does not reach the predetermined value, the conventional playback equipment restarts the detection of the synchronizing signal from an address leading the determined address.
[Patent reference 1] JP, 2005-259220, A However, according to the technology disclosed by above-mentioned patent reference 1, while it can be judged whether or not the digital acoustic signal is a stream signal before the digital acoustic signal is decoded, it is necessary to count the amount of data regardless of whether the counter reaches the predetermined amount. Furthermore, because the conventional playback apparatus has to carryout the detection of the synchronizing signal again when the counter does not reach the predetermined amount, the conventional playback apparatus requires useless time until it outputs an audio and therefore does not prevent a bad influence from being exerted on the playback starting time. Thus, the technology does not provide any solution to the case in which the user doubts that the CD medium is a defective or the playback apparatus is out of order.

The present invention is made in order to solve the above-mentioned problems, and it is therefore an object of the present invention to provide a disc playback apparatus that shortens the playback starting time so as to prevent the user from doubting that the disc playback apparatus is out of order.

DISCLOSURE OF THE INVENTION

In order to solve the above-mentioned problems, a disc playback apparatus in accordance with the present invention includes: a data processing unit for reading at least two audio files recorded in a disc, the audio files having different data formats, and converting the audio files into digital data to store them in a storage unit; a decoder for decoding the audio files respectively corresponding to the above-mentioned data formats, which are stored in the above-mentioned storage unit, on a basis of a file attribute preset thereto, and playing back the decoded audio files; and a control unit for reading data stored in the above-mentioned storage unit and delivering the data to the above-mentioned decoder, for determining a file attribute of the above-mentioned read data when starting the above-mentioned decoding and playback process on a basis of the file attribute set to the above-mentioned decoder, and for, when the file attribute differs from the file attribute set to the above-mentioned decoder, holding address information about the above-mentioned read data, and, after stopping reading of subsequent data, changing the setting of the file attribute made for the above-mentioned decoder and then restarting to read the above-mentioned data by using the above-mentioned address information held thereby.

In accordance with the present invention, the disc playback apparatus shortens the playback starting time so as to prevent the user from doubting that the disc playback apparatus is out of order.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
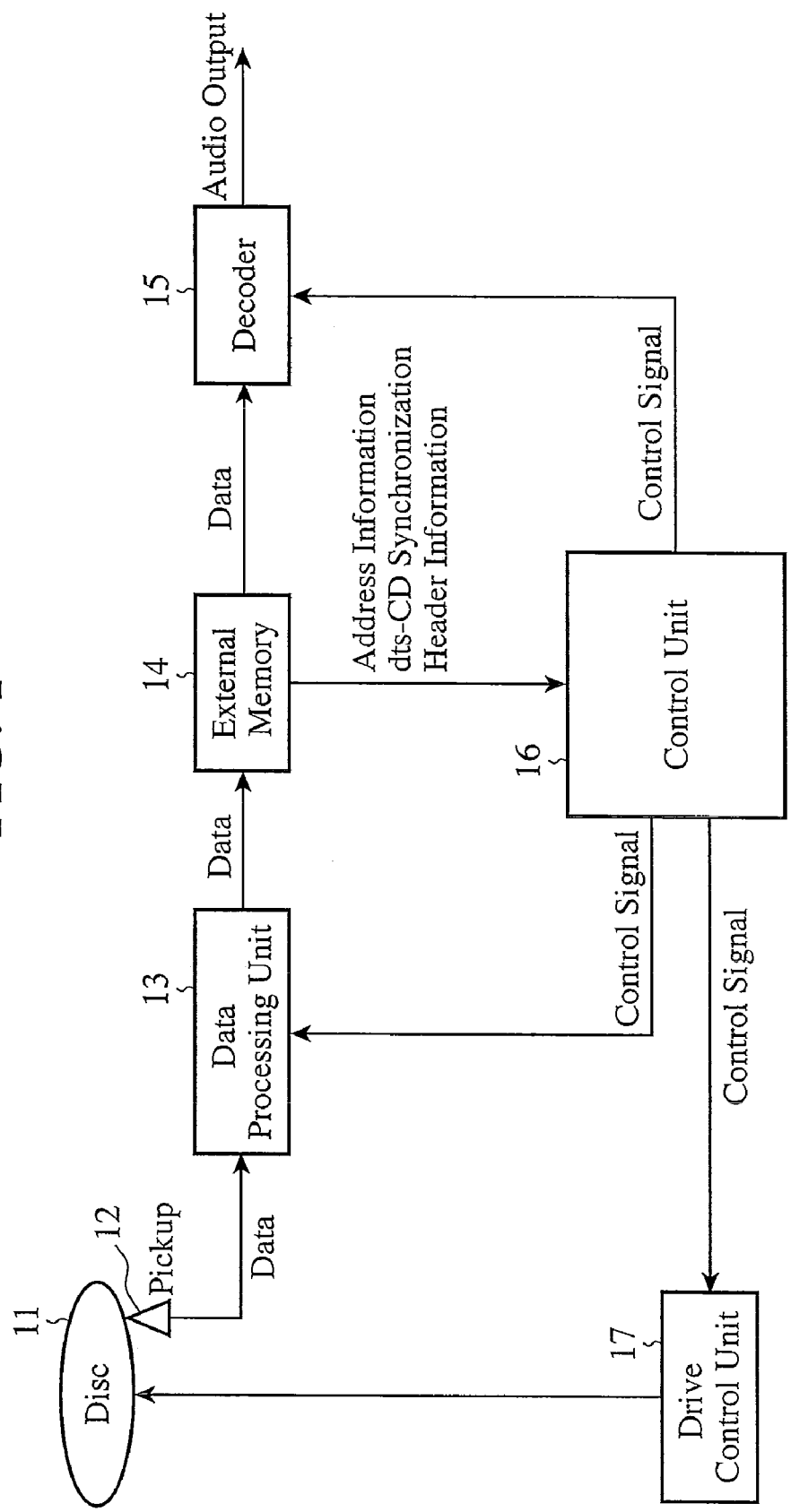
FIG. 1 is a block diagram showing the internal structure of a disc playback apparatus in accordance with Embodiment 1 of the present invention.

FIG. 1 is a block diagram showing the internal structure of a disc playback apparatus in accordance with Embodiment 1 of the present invention.

The disc playback apparatus in accordance with Embodiment 1 of the present invention is comprised of a disc 11, a pickup 12, a data processing unit 13, an external memory 14, a decoder 15, a control unit 16, and a drive control unit 17.

In this case, it is assumed that a music file which is recorded according to the CD-DA specifications and a music file which is recorded according to the dts-CD specifications are mixedly recorded in the disc 11. Data read from the disc 11 via the pickup 12 are furnished to the data processing unit 13. The data processing unit 13 converts an analog signal outputted by the pickup 12 into digital data and delivers the digital data to the external memory 14 as a storage unit. The external memory 14 temporarily stores the data delivered thereto.

The decoder 15 supports the CD-DA specifications and the dts-CD specifications, decodes the audio file stored in the external memory 14 on the basis of a file attribute (CD-DA or dts-CD) preset thereto, and plays back and outputs the decoded audio file to a not-shown playback system.

The control unit 16 is concretely constructed of a control microcomputer, and reads the data stored in the external memory 14 and delivers the data to the decoder 15 according to a built-in program. The control unit also determines the file attribute of the data from the read data. When the determined file attribute differs from the file attribute preset to the decoder 15, the control unit 16 performs a process of holding the address information about the read data, changing the setting of the file attribute to the decoder 15 after stopping a process of reading the subsequent data, and restarting to read and play back the data using the address information held previously. In contrast, when the determined file attribute is the same as the preset file attribute, the control unit 16 also performs a process of releasing a mute playback and starting an ordinary playback.

The drive control unit 17 controls a disc drive including the pickup 12 under the control of the control unit 16. More specifically, the drive control unit moves the pickup 12 to a track to be played back, drives an actuator in order to perform focus control, and controls these units by using a servo mechanism.

The operation of the disc playback apparatus shown in FIG. 1 will be briefly explained below. First, data read from the disc 11 via the pickup 12 are converted into digital data by the data processing unit 13, and are temporarily stored in the external memory 14. At this time, the control unit 16 confirms that the data have been stored in the external memory 14, and provides a playback control command to the decoder 15. The decoder 15 then reads the data from the external memory 14, and outputs, as an audio output, a playback signal which the decoder has acquired as a result of performing a decoding process on the data to the not-shown playback system.

In the above-mentioned audio playback process, when providing the playback control command to the decoder 15, the control unit 16 acquires address information and dts-CD synchronization header information from the data read from the external memory 14, holds the address information at the time of detecting data having a file attribute different from the decoding setting, and stops reading of the subsequent data. The control unit 16 then changes the setting made for the decoder 15 from CD-DA to dts-CD, and also furnishes a control signal for moving the pickup 12 to a track position based on the address information acquired previously to restart an audio playback to the drive control unit 17.

Figure 2:
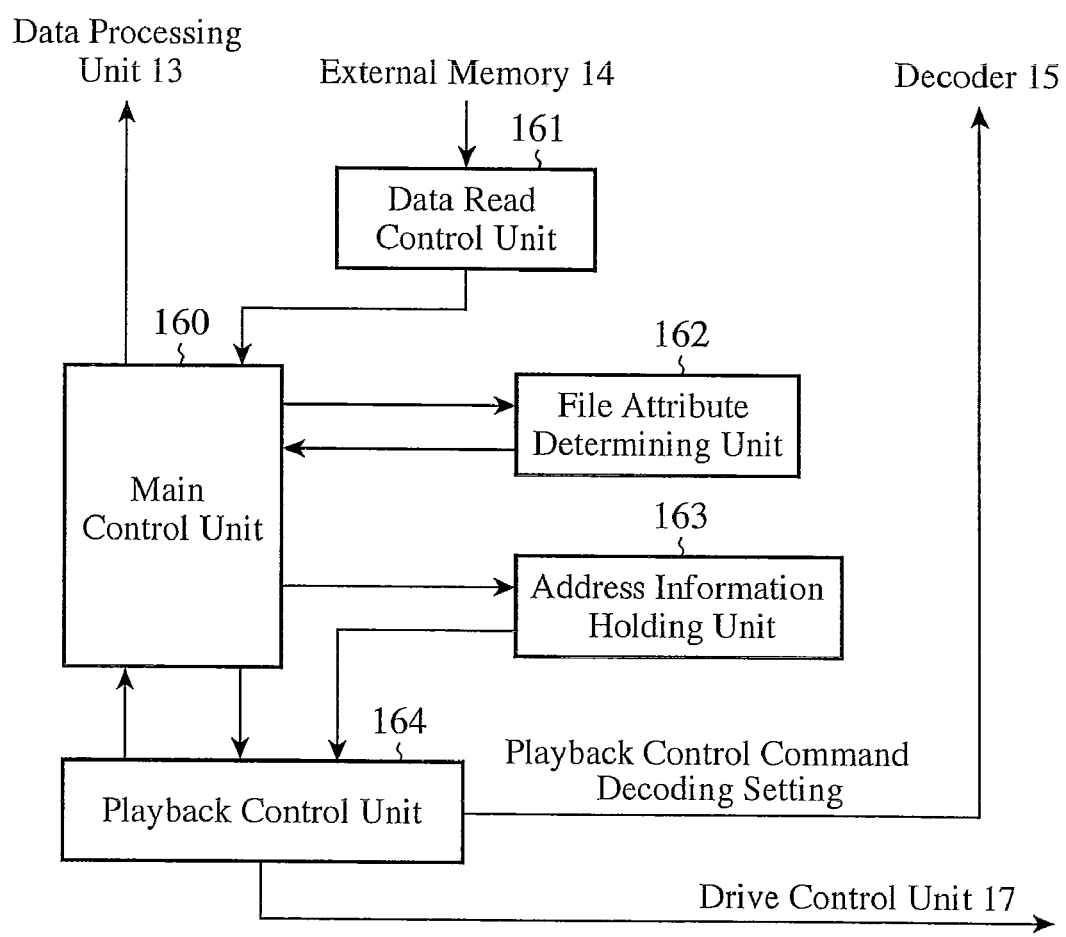
FIG. 2 is a block diagram showing functional development of the internal structure of a control unit of the disc playback apparatus in accordance with Embodiment 1 of the present invention.

FIG. 2 is a block diagram showing functional development of the internal structure of the control unit 16 shown in FIG. 1. As shown in FIG. 2, the control unit 16 is comprised of a main control unit 160, a data read control unit 161, a file attribute determining unit 162, an address information holding unit 163, and a playback control unit 164.

The main control unit 160 controls each of the data processing unit 13, the decoder 15, and the drive control unit 17 which are connected thereto, reads the data stored in the external memory 14 and delivers the data to the decoder 15, and simultaneously determines the file attribute of the data from the read data. When the determined file attribute differs from the file attribute set to the decoder 15, the main control unit 160 holds the address information about the read data and stops the reading of the subsequent data. After that, the main control unit changes the setting of the file attribute made for the decoder 15, and performs a function of operating as a control center of the control unit 16 that restarts to read and play back the data by using the address information held previously.

Therefore, the data read control unit 161 reads the data stored in the external memory 14 and then delivers the data to the decoder 15, and also reads the data from the external memory 14. The file attribute determining unit 162 then determines the file attribute of the file recorded in the disc 11 with reference to the header information about the data read from the external memory 14.

Furthermore, when the file attribute determined by the file attribute determining unit 162 differs from the file attribute preset to the decoder 15, the address information holding unit 163 holds the address information about the read data. When the file attribute determined by the file attribute determining unit 162 differs from the preset file attribute, the playback control unit 164 performs a control operation of performing a mute playback, and, after temporarily stopping the reading of the subsequent data by the data read control unit 161, changing the setting of the file attribute made for the decoder 15 and then restarting to read and play back the data by using the address information which the address information holding unit 163 has held previously. Each of these steps is performed under the sequence control of the main control unit 160.

Figure 3:
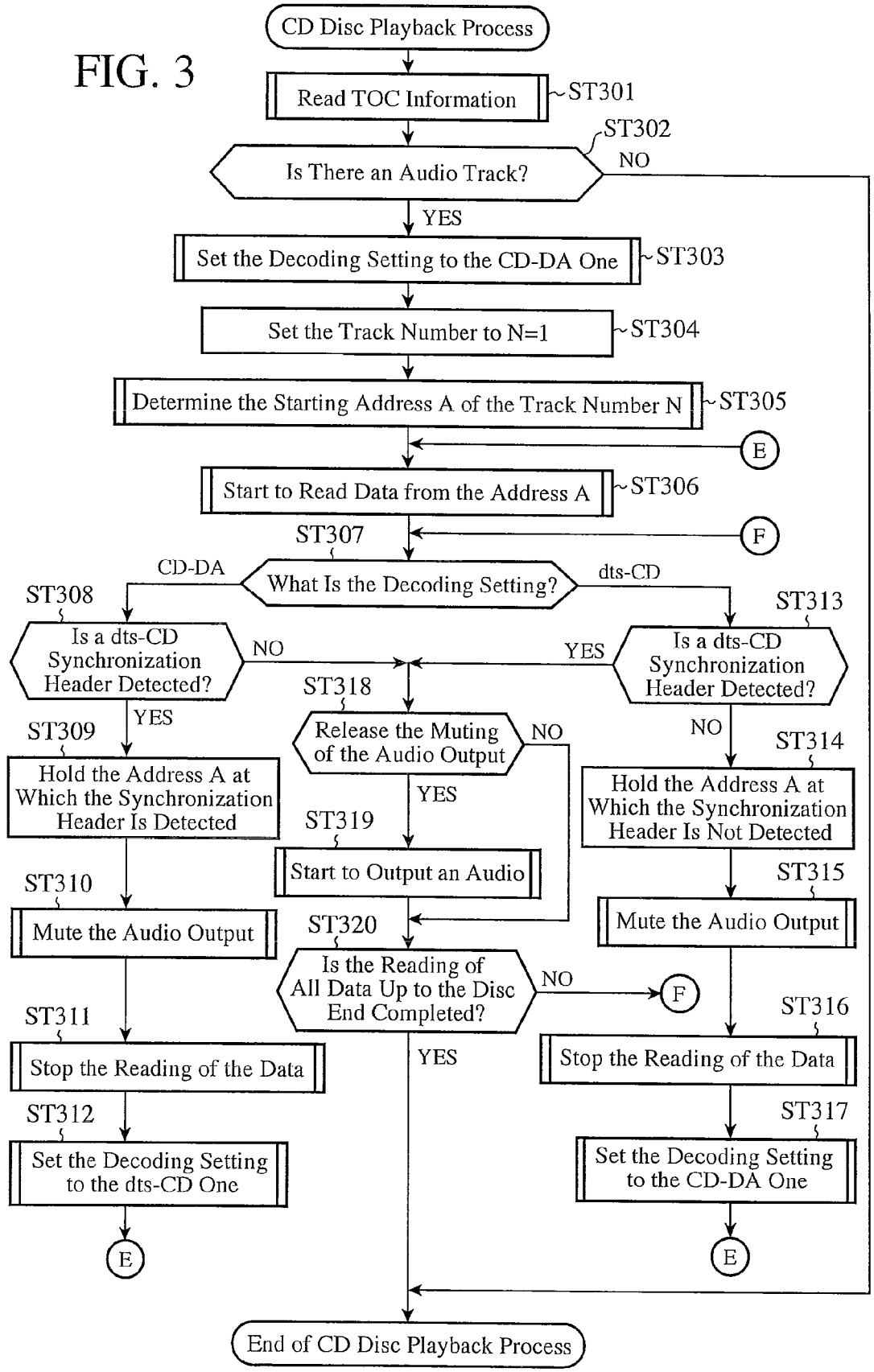
FIG. 3 is a flow chart showing the disc playback processing operation of the disc playback apparatus in accordance with Embodiment 1 of the present invention.

FIG. 3 is a flow chart showing the playback processing operation of the disc playback apparatus in accordance with Embodiment 1 of the present invention.

Hereafter, the playback processing operation of the disc playback apparatus in accordance with Embodiment 1 of the present invention shown in FIGS. 1 and 2 will be explained in detail with reference to the flow chart of FIG. 3.

The control unit 16 (the main control unit 160) reads TOC (Table Of Contents) information recorded in a predetermined area of the disc 11 first, and refers to the total number of tracks on the basis of this TOC information and also judges whether or not each of the tracks is an audio track (step ST301). When judging that each of the tracks is an audio track (if "YES" in step ST302), the main control unit 160 sets the CD-DA file attribute (the CD-DA decoding setting) to the decoder 15 (step ST303).

Next, the main control unit 160 sets 1 to a track number (a variable N) (step ST304), determines the starting address A of this track 1 (step ST305), and controls the data read control unit 161 to cause this the data read control unit to read all the data from the address A to the last track address of the disc 11. The data read control unit 161 then starts to read the data from the address A of the external memory 14 according to the instruction from the main control unit 160 (step ST306).

At this time, the file converted into the digital data by the data processing unit 13 has been stored in the external memory 14. Furthermore, the data stored in the external memory 14 have been delivered to the decoder 15. In addition, the decoder 15 has started a decoding playback process based on the decoding setting (in this case, the CD-DA decoding setting) which is provided by default. At this time, the file attribute determining unit 162 can determine the file attribute of the file by detecting if the data include synchronization header information which is added to dts-CD data.

The main control unit 160 refers to the file attribute (the decoding setting) (step ST307), and, as a result, when determining that the decoding setting is the CD-DA one (if "CD-DA" in step ST307) and then detecting that the data include dts-CD synchronization header information (if "YES" in step ST308), controls the address information holding unit 163 to cause the address information holding unit 163 to hold the address information A at this time (step ST309). Next, the main control unit 160 starts the playback control unit 164 so as to cause the playback control unit 164 to control the not-shown playback system to carry out mute control of the output of the decoder 15 (playback and output of audio) (step ST310), and also stops the reading of the data from the external memory 14 by the data read control unit 161 (step ST311).

Furthermore, the playback control unit 164 changes the setting made for the decoder 15 to dts-CD (step ST312), and causes the data read control unit 161 to restart to read the data using the address information A which the address information holding unit 163 has held previously so as to perform a decoding playback (step ST306).

More specifically, when, as a result of determining the file attribute of the read data, determining that the read data have a file attribute different from the current setting of the decoder 15, the main control unit 160 holds the address at that time in the address information holding unit 163, and, when the audio output reaches data corresponding to the address information, mutes the audio output temporarily. Next, the main control unit 160 changes the setting of the decoder 15 according to the determined file attribute, and, after that, according to the address information held by the address information holding unit 163, controls the drive control unit 17 to cause this drive control unit to carryout control of the movement of the pickup 12 so as to restart to read the data from the disc 11, and then releases the mute of the audio output.

In contrast, when the decoding setting is the dts-CD one (if "dts-CD" in step ST307) and the file attribute determining unit 162 has failed in detecting the dts-CD synchronization header information (if "YES" in step ST313), the address information holding unit 163 holds the address information A at the time of not detecting the dts-CD synchronization header information under the control of the main control unit 160 (step ST314). The main control unit 160 then starts the playback control unit 164 so as to cause the playback control unit 164 to carry out mute control of the audio output and stop the reading of the data by the data read control unit 161 temporarily (steps ST315 and ST316), and, after that, changes the decoding setting made for the decoder 15 to the CD-DA one (step ST317).

Next, the main control unit 160 starts the data read control unit 161 so as to cause the data read control unit 161 to restart to read the data from the external memory 14 on the basis of the address information A previously held by the address information holding unit 163 (step ST306).

In contrast, when the decoding setting is the CD-DA one (if "CD-DA" in step ST307), and the file attribute determining unit 162 has failed in detecting the dts-CD synchronization header information (if "NO" in step ST308), or when the decoding setting is the dts-CD one (if "dts-CD" in step ST307) and the file attribute determining unit has succeeded in detecting the dts-CD synchronization header information (if "YES" in step ST313), that is, when the determined file attribute is the same as the preset file attribute, if confirming that the mute of the audio output has been released (if "YES" in step ST318), the main control unit 160 starts the audio output (step ST319). After that, the file attribute determining unit 162 performs the detection of whether the dts-CD synchronization header information is included in each of all data (including up to data recorded at the disc's end) read by the data read control unit 161, and repeatedly carries out the above-mentioned procedures until all the data are read (step ST320).

Figure 4:
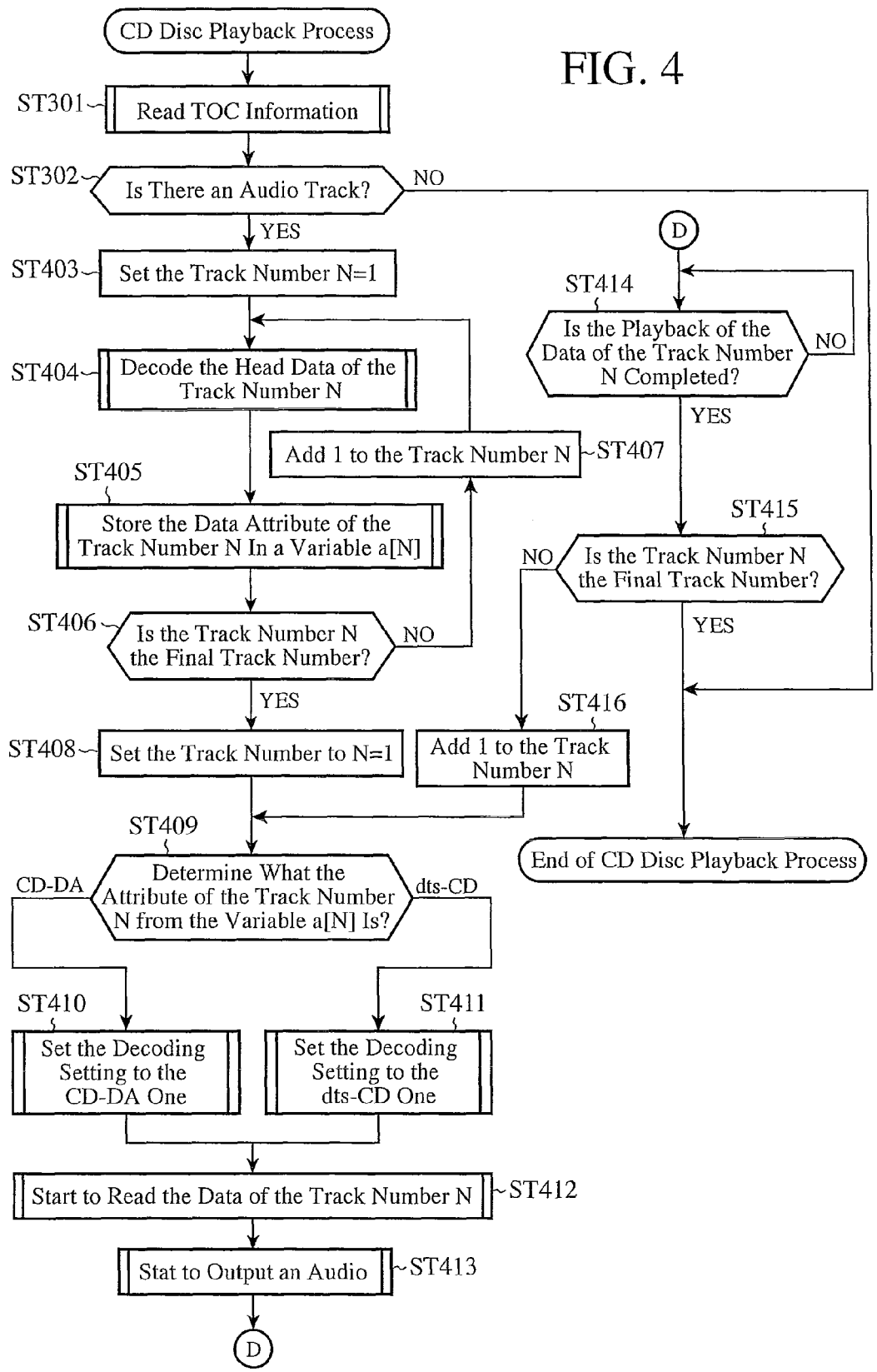
FIG. 4 is a flow chart showing the playback processing operation of a conventional disc playback apparatus.

In order to clarify the difference between the disc playback operation of the above-mentioned disc playback apparatus in accordance with Embodiment 1, and the disc playback operation of a conventional disc playback apparatus for comparison between them, a flow of the disc playback process of the conventional disc playback apparatus is shown in FIG. 4 in the form of a flow chart.

Briefly explaining the flow chart of FIG. 4, the conventional disc playback apparatus reads TOC information from a disc 11 first, and then acquires the total number of tracks and information showing whether or not each of the tracks is an audio track (step ST401). The conventional disc playback apparatus then determines whether or not there is an audio track (step ST402), and, when there is an audio track (if "YES" in step ST402), reads the head data of each track from the disc 11, decodes them, and stores attribution information indicating whether each track is of CD-DA type or dts-CD type in a variable a [N] (steps ST404 and ST405). After storing the attribution information about each of all the tracks, the conventional disc playback apparatus sets 1 to a track number N, and determines the file attribute of a track to be played back from the variable a [N] (step ST409) and sets the file attribute to the decoder thereof (steps ST410 and ST411). After that, the conventional disc playback apparatus reads the data of the track number N from the disc 11, and starts to output audio (steps ST412 and ST413). When completing the playback of the data of the track number N (step ST414), the conventional disc playback apparatus adds 1 to the track number N (step ST416) if the track number N is not the final track number (if "NO" in step ST415), and the repeats the processes of step S409 and subsequent steps again.

As can be seen from the comparison between the flow chart of FIG. 3 and that of FIG. 4, the disc playback apparatus in accordance with Embodiment 1 of the present invention is characterized that the disc playback apparatus carries out the processes of steps S308 and S314 shown in FIG. 3. More specifically, the disc playback apparatus (the control unit 16) is characterized in that the disc playback apparatus starts a playback of the read data first according to the decoding setting which has been set by default, and, when detecting the dts-CD synchronization header information from the read data, holds the address information at that time and, after temporarily muting the audio output and then changing the decoding setting, starts to read the data from the held address again and then continues the playback of the data.

When the decoding setting is the CD-DA one and the disc playback apparatus has succeeded in detecting the dts-CD synchronization header information, or when the decoding setting is the dts-CD one and the disc playback apparatus has failed in detecting the dts-CD synchronization header information, the disc playback apparatus performs the above-mentioned control operation to eliminate the processes of steps S404 and S405, which are, as the conventional disc playback processes, shown in FIG. 4, i.e. the process of decoding the data in advance and the process of then detecting the file attribute indicating whether each track is of CD-DA type or dts-CD type. Therefore, the disc playback apparatus can shorten the time required to output audio greatly.

Furthermore, in the conventional disc playback process, the file attribute is detected only on a track-by-track basis even in a special case in which CD-DA data and dts-CD data are mixedly recorded in one track. Therefore, in a case in which data having a file attribute different from the decoding setting set to the decoder appear at midpoint in a track, the data cannot be decoded and therefore a normal audio output cannot be generated. In contrast, because the disc playback apparatus in accordance with Embodiment 1 of the present invention always checks to see whether the file attribute of the read data matches the decoding setting, the disc playback apparatus can flexibly deal with a change in the data type which occurs at an arbitrary address on the disc 11, and can therefore generate a normal audio output at all times.

As previously explained, when playing a dts-CD disc, the disc playback apparatus in accordance with Embodiment 1 of the present invention temporarily sets the setting of the decoder 15 to the CD-DA one and then starts the playback process, and, when identifying the file attribute (dts-CD data) immediately before inputting the data read from the disc 11 to the decoder 15, holds the address information and mutes the audio output. After that, the disc playback apparatus changes the setting of the decoder 15 to the dts-CD one promptly and then starts a playback from the address information position held previously. Therefore, the disc playback apparatus in accordance with Embodiment 1 of the present invention does not need to identify whether the disc 11 inserted thereinto is a dts-CD or CD-DA in advance. Accordingly, the disc playback apparatus can provide a time reduction by the length of time required to perform this process, and can therefore generate an audio output promptly after the disc 11 is inserted thereinto. Therefore, the disc playback apparatus can shorten the playback starting time and can also prevent the user from doubting that the CD medium is a defective or the playback equipment is out of order.

Furthermore, the disc playback apparatus in accordance with Embodiment 1 of the present invention determines the file attribute immediately before furnishing the data to the decoder 15. Therefore, even in a case in which CD-DA data and dts-CD data are mixedly recorded at an arbitrary position in the disc 11, the disc playback apparatus can detect this mixture and generate an audio output appropriately. Conventionally, although each of CD-DA data and dts-CD data can be recorded into a CD medium, when each of them are played back by a PC or the like, it is difficult to discriminate between them without analyzing the data to be played back because they have the same extension. By applying the present invention to a playback of such a disc including CD-DA data and dts-CD data by equipment such as a PC, because the equipment can automatically discriminate between them while playing back the disc, a large advantage can be provided.

In above-mentioned Embodiment 1 of the present invention, a playback of the disc 11 in which CD-DA data and dts-CD data are mixedly recorded is shown as an example, though the present invention is not limited to the above-mentioned combination and can be applied to a playback of any medium in which files having different data formats, e.g. MP3, ATRAC (Adaptive Transform Acoustic Coding), and so on are mixedly recorded.

Furthermore, the functions which each of the configuration blocks shown in FIG. 2 (the main control unit 160, the data read control unit 161, the file attribute determining unit 162, the address information holding unit 163, and the playback control unit 164) included in the control unit 16 has can be all implemented via software, or at least a part of them can be implemented via hardware. For example, the processing performed by the main control unit 160 can be implemented by one or more programs which run on a computer, or at least a part of the processing can be implemented via hardware.

INDUSTRIAL APPLICABILITY

As mentioned above, the disc playback apparatus in accordance with the present invention shortens the playback starting time so as to prevent the user from doubting that the disc playback apparatus is out of order. Therefore, the disc playback apparatus in accordance with the present invention is suitable for use in playback or the like of a disc in which audio files having different data formats are recorded.

The invention claimed is:

1. A disc playback apparatus characterized in comprising:
    a data processing unit for reading at least two audio files recorded in a disc, the audio files having different data formats, and converting the audio files into digital data to store them in a storage unit;
    a decoder for decoding the audio files respectively corresponding to said data formats, which are stored in said storage unit, on a basis of a file attribute preset thereto, and playing back the decoded audio files; and
    a control unit for reading data stored in the said storage unit and delivering the data to said decoder, for determining a file attribute of said read data when starting said decoding and playback process on a basis of the file attribute set to said decoder, and for, when the file attribute differs from the file attribute set to said decoder, holding address information about said read data, and, after stopping reading of subsequent data, changing the setting of the file attribute made for said decoder and then restarting to read said data by using said address information held thereby.

2. The disc playback apparatus according to claim 1, characterized in that said control unit performs a process of changing a setting of a file attribute of an audio file having a same extension on said decoder.

3. The disc playback apparatus according to claim 1, characterized in that said control unit includes:
    a data read control unit for reading data stored in said storage unit and then delivering the data to said decoder, and for reading data from said storage unit;
    a file attribute determining unit for referring to header information about said read data to determine a file attribute of a file recorded in said disc;
    an address information holding unit for holding the address information about said read data when said determined file attribute differs from the file attribute preset to said decoder; and
    a playback control unit for performing a mute playback when the file attribute determined by said file attribute determining unit differs from the file attribute preset to said decoder, for changing the setting of the file attribute made for said decoder after stopping the reading of the subsequent data by said data read control unit and then restarting to read said data by using the address information held by said address information holding unit, and for, when the file attribute determined by said file attribute determining unit is a same as the file attribute preset to said decoder, releasing the mute playback and starting an ordinary playback.

4. The disc playback apparatus according to claim 3, characterized in that when said determined file attribute is a same as the preset file attribute, said playback control unit releases said mute playback and starts an ordinary playback.

* * * * *